(12) United States Patent
Lin et al.

(10) Patent No.: US 11,081,720 B2
(45) Date of Patent: Aug. 3, 2021

(54) CATHODE PLATE AND PREPARATION METHOD THEREOF, AND LITHIUM ION BATTERY

(71) Applicant: SHENZHEN CAPCHEM TECHNOLOGY CO., LTD., Guangdong (CN)

(72) Inventors: Muchong Lin, Guangdong (CN); Qiao Shi, Guangdong (CN); Ruixing Liu, Guangdong (CN)

(73) Assignee: SHENZHEN CAPCHEM TECHNOLOGY CO., LTD., Shenzhen (CN)

( * ) Notice: Subject to any disclaimer, the term of this patent is extended or adjusted under 35 U.S.C. 154(b) by 184 days.

(21) Appl. No.: 16/311,674

(22) PCT Filed: Dec. 29, 2016

(86) PCT No.: PCT/CN2016/113049
§ 371 (c)(1),
(2) Date: Dec. 19, 2018

(87) PCT Pub. No.: WO2018/094822
PCT Pub. Date: May 31, 2018

(65) Prior Publication Data
US 2019/0207242 A1    Jul. 4, 2019

(30) Foreign Application Priority Data
Nov. 25, 2016 (CN) .......................... 201611054011.3

(51) Int. Cl.
| | |
|---|---|
| *H01M 10/04* | (2006.01) |
| *H01M 4/131* | (2010.01) |
| *H01M 4/1391* | (2010.01) |
| *H01M 10/0525* | (2010.01) |
| *H01M 4/505* | (2010.01) |
| *H01M 4/62* | (2006.01) |
| *H01M 4/525* | (2010.01) |
| *H01M 4/04* | (2006.01) |
| *H01M 4/136* | (2010.01) |
| *H01M 4/58* | (2010.01) |

(52) U.S. Cl.
CPC ....... *H01M 10/045* (2013.01); *H01M 4/0404* (2013.01); *H01M 4/131* (2013.01); *H01M 4/1391* (2013.01); *H01M 4/505* (2013.01); *H01M 4/525* (2013.01); *H01M 4/621* (2013.01); *H01M 4/622* (2013.01); *H01M 4/625* (2013.01); *H01M 10/0525* (2013.01); *H01M 4/136* (2013.01); *H01M 4/5825* (2013.01)

(58) Field of Classification Search
CPC .... H01M 10/045; H01M 4/525; H01M 4/622; H01M 4/0404; H01M 4/131; H01M 4/1391; H01M 10/0525; H01M 4/505; H01M 4/625; H01M 4/621; H01M 4/136; H01M 4/5825; H01M 4/628
USPC .................................................. 429/231.95
See application file for complete search history.

(56) References Cited

U.S. PATENT DOCUMENTS

2012/0135308 A1* 5/2012 Loveridge ............... H01M 4/38
                                                        429/217
2017/0133712 A1* 5/2017 Mimura ................ H01M 4/043

FOREIGN PATENT DOCUMENTS

CN          1507669 A      6/2004

OTHER PUBLICATIONS

International Search Report of PCT Patent Application No. PCT/CN2016/113049 dated Aug. 15, 2017.

* cited by examiner

*Primary Examiner* — Gary D Harris

(57) ABSTRACT

Provided are a cathode plate of a lithium ion battery and a preparation method therefor and a lithium ion battery. The cathode plate comprises a cathode current collector and a cathode material located on the cathode current collector. The cathode material comprises a cathode active material, a binder, a conductive agent and an additive, wherein the additive comprises at least one of the compounds shown by structural formula I; and in structural formula I, the monomer of R is R1, R1 is an alkenyl compound or an ether compound containing an alkenyl, and n is a positive integer. The cathode plate contains a compound shown by structural formula I. The compound forms a protective layer on the surface of the particles of the cathode active material and reduces a side reaction between the cathode active material and an electrolyte at a high voltage.

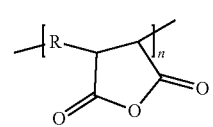

formula I

9 Claims, No Drawings

CATHODE PLATE AND PREPARATION METHOD THEREOF, AND LITHIUM ION BATTERY

TECHNICAL FIELD

The present application relates to the field of battery slurry, and in particular to a cathode plate, a preparation method thereof, and a lithium ion battery.

BACKGROUND OF THE INVENTION

Lithium-ion batteries have the characteristics of high specific energy, high specific power and long cycle life. They are currently mainly used in 3 C digital consumer electronics products, as well as new energy power vehicles and energy storage. With the continuous improvement of the requirements for the cruising range of new energy vehicles and the continuous miniaturization of digital consumer electronics products, high energy density has become the main development trend of lithium-ion batteries. Increasing the operating voltage of lithium-ion batteries is an effective way to increase the energy density of batteries.

However, increasing the operating voltage of a lithium-ion battery tends to degrade the performance of the battery. This is because on the one hand, there is a certain instability in the crystal structure of the cathode of the battery at high voltages, which would result in collapse of the structure in the process of charging and discharging, leading to degradation of the performance, and on the other hand, the surface of the cathode is in a high oxidation state and has a high activity at high voltages, which would result in catalytic oxidative decomposition of the electrolyte. The decomposition products of the electrolyte would easily deposit on the surface of the cathode, blocking the deintercalation channels for lithium ions, thereby deteriorating the battery performance.

In order to improve the stability of a cathode material, the current technology generally modifies the cathode material by inorganic doping and inorganic coating. On the one hand, doping is employed to improve the stability of the crystal structure of the cathode material in the process of charging and discharging, and on the other hand, surface coating of the cathode material is employed to reduce a side reaction between the cathode material and the electrolyte, thereby improving the battery performance. Doping and coating are currently the most commonly used methods that can effectively improve the material properties. However, both methods suffer from complex production processes and high production costs, among other problems. Currently, inorganic coating is mostly employed to modify the surface of a cathode active material. The inorganic coating layer on the surface of the cathode active material can reduce a side reaction between the cathode interface and the electrolyte, which provides a better performance improvement. However, the inorganic coating layer suffers from poor mechanical properties, which would result in cracking during long-term cycling. Moreover, the coverage of the coating layer is uneven, which would result in abrupt decrease in battery capacity at the later stage during long-term cycling of the battery.

SUMMARY OF THE INVENTION

An object of the present application is to provide an improved cathode plate, a preparation method thereof, and a lithium-ion battery.

In order to achieve the above object, the present application adopts the following technical solutions:

In one aspect, the present application discloses a cathode plate of a lithium-ion battery, comprising a cathode current collector and a cathode material on the cathode current collector, the cathode material comprising a cathode active material, a binder, a conductive agent and an additive, the additive including at least one compound represented by structural formula I;

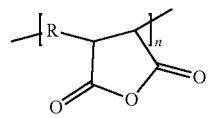

structural formula I

The monomer of R in structural formula I is R1, and R1 is an alkenyl compound or an alkenyl-containing ether compound, and n is a positive integer.

It should be noted that the cathode material in the present application is characterized in that it comprises a compound represented by structural formula I, which is uniformly dispersed on the surface of the particles of the cathode active material. In the cathode plate comprising the cathode material provided by the present application, the normal temperature structural formula I can, during formation and charging of the battery, form an effective protective film on the surface of the cathode active material to protect the cathode active material, thereby achieving the purpose of improving the performance of the cathode material. The organic coating layer formed by the compound represented by structural formula I is different from an ordinary inorganic coating layer on the surface of the cathode active material in that the organic coating layer has good mechanical properties, has some flexibility, has uniform coverage, can be effectively repaired during cycling of the battery, and can significantly improve the long-term cycling performance of the battery. The cathode plate comprising the cathode material of the present application, when used in a lithium-ion battery, can allow the battery to further achieve excellent cycling performance and storage performance.

It should be noted that the key of the present application lies in that the cathode material comprises the compound represented by structural formula I. As for other components of the positive material, such as a binder, a conductive agent, a dispersant, etc., reference can be made to a conventional cathode material, and no specific limitation is imposed herein. The binder and the conductive agent are specifically defined in preferred embodiments of the present application, which will be described in detail hereinbelow.

More preferably, the compound represented by structural formula I has a molecular weight of between 50,000 and 2,000,000.

Those skilled in the art appreciate that the compound represented by structural formula I can be obtained by copolymerizing a maleic anhydride monomer with monomer R1 (an alkenyl compound or an alkenyl-containing ether compound), and monomer R1 becomes R in the compound represented by structural formula I formed by copolymerization.

More preferably, the compound represented by structural formula I is selected from at least one compound represented by structural formula II, structural formula III, structural formula IV and structural formula V;

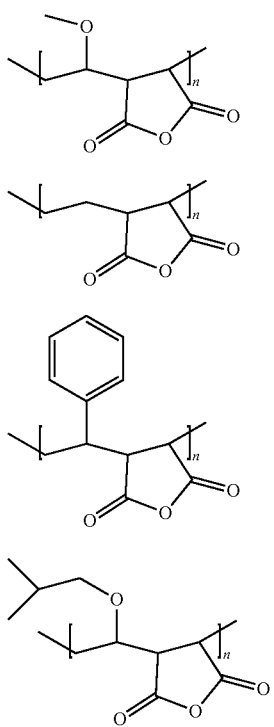

structural formula II structural formula III structural formula IV structural formula V wherein in structural formula II, structural formula III, structural formula IV and structural formula V, n is a positive integer.

It should be noted that the present applicant has found through research that the compound represented by structural formula I can protect the cathode, with the compound of a molecular weight of 50,000 to 2,000,000 having a more excellent effect; and the compounds of structural formula II, structural formula III and structural formula IV are the three specific compounds employed in preferred embodiments of the present application, with the compound represented by structural formula II being especially preferred.

Preferably, the compound represented by structural formula I accounts for 0.1% to 5% of the total weight of the cathode material.

It should be noted that the present applicant has found through research that in the cathode material provided in the present application, the amount of the compound represented by structural formula I will also affect its effect. In the cathode material layer of the cathode plate, when the mass ratio of the compound represented by structural formula I is 0.1% to 5%, the reaction between the cathode active material and the electrolyte at high voltages can be significantly reduced, and the cycling performance and high-temperature storage performance of the battery can be significantly improved. When the mass ratio is less than 0.1%, the protective effect of the compound represented by structural formula I on the cathode active material is relatively decreased; and when the mass ratio is more than 5%, the impedance of the battery is increased, and the low-temperature performance and power performance of the battery are deteriorated. Moreover, when the content of the compound represented by structural formula I in the cathode material layer is more than 5%, the content of the cathode active material in the cathode material layer is inevitably lowered, thereby reducing the energy density of the battery. Therefore, in a preferred embodiment of the present application, the compound represented by structural formula I accounts for 0.1% to 5% of the total weight of the cathode material.

Preferably, the cathode material further comprises a binder and a conductive agent, the binder accounting for 0.5% to 5% of the total weight of the cathode material, and the conductive agent accounting for 0.5% to 5% of the total weight of the cathode material.

It should be noted that the key to the present application lies in the addition of the compound represented by structural formula I, and the other components in the cathode material or the cathode plate are the same as in the prior art. In view of the overall effect, preferred embodiments of the present application defines that the binder accounts for 0.5% to 5% of the total weight of the cathode material, and the conductive agent accounts for 0.5% to 5% of the total weight of the cathode material.

Preferably, the conductive agent is at least one selected from the group consisting of conductive carbon black, superconducting carbon black, conductive graphite, acetylene black, and carbon nanotube.

More preferably, the conductive agent is at least one selected from the group consisting of conductive carbon black, conductive graphite, and acetylene black.

More preferably, the conductive agent is conductive carbon black and/or acetylene black.

Most preferably, the conductive agent is conductive carbon black.

Preferably, the binder is at least one selected from the group consisting of polyvinyl alcohol binder, polyurethane binder, polyacrylate binder, butyl rubber binder, epoxy resin binder, vinyl acetate resin binder, chlorinated rubber binder, polyvinylidene fluoride binder, and polytetrafluoroethylene binder.

More preferably, the binder is polyvinylidene fluoride binder.

Preferably, the cathode active material is selected from at least one compound represented by general formula I, general formula II and general formula III; general formula I being $Li_xNi_yM_{1-y}O_2$, general formula II being $Li_xCo_kM'_{1-k}O_2$, and general formula III being $Li_{x''}M''PO_4$, wherein, in general formula I, $0.5 \leq x \leq 1$, $y \geq 0.3$, M is at least one of Co, Mn, Al, Ti, Fe, Zn, Zr, Mg, Cr and Ba; in general formula II, $0.5 \leq x' \leq 1$, $k \geq 0.8$, M' is at least one of Ni, Mn, Al, Ti, Fe, Zn, Zr, Mg, Cr and Ba; and in general formula III, $0.5 \leq x'' \leq 1$, M'' is at least one of Ni, Mn and Co.

Preferably, the cathode active material is $LiNi_{0.5}Mn_{0.3}Co_{0.2}O_2$.

Another aspect of the present application discloses a method for preparing a cathode plate, comprising the steps of:

(1) adding and dispersing a cathode active material, a conductive agent, a binder, and an additive into a solvent to obtain a cathode slurry;

wherein the additive comprises at least one compound represented by structural formula I;

structural formula I

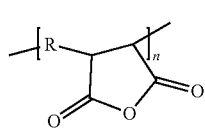

wherein the monomer of R in structural formula I is R1, and R1 is an alkenyl compound or an alkenyl-containing ether compound, and n is a positive integer;

(2) coating the cathode slurry obtained in step (1) onto the surface of a cathode current collector, followed by drying, roll pressing and cutting to obtain the cathode plate. A further aspect of the present application discloses a lithium-ion battery using the cathode plate of the present application or the cathode material of the present application.

By adopting the above technical solutions, the present application has the following beneficial effects:

The cathode material of the present application comprises the compound represented by structural formula I, which forms a protective layer on the surface of the particles of the cathode active material, thus reducing a side reaction between the cathode active material and the electrolyte at high voltages, thereby improving the performance of a lithium-ion battery at high voltages. The cathode plate using the cathode material of the present application allows to further improve the cycling performance and storage performance of the lithium ion battery.

DETAILED DESCRIPTION

In view of the fact that the coating methods currently used for modifying a cathode active material suffer from the problem of complex production processes and high production costs, the present applicant conducted research and creatively designed and invented a simple and effective method for surface coating of a cathode active material by adding a compound represented by structural formula I to a conventional cathode material. In preparing the electrode plate, the compound represented by structural formula I is mixed with the cathode active material and other components to form a cathode slurry, which is then coated onto a cathode current collector. Upon drying, the compound represented by structural formula I uniformly distributes on the surface of the particles of the cathode active material. And then upon formation and charging of the battery, the compound will produce a passivation film which uniformly covers the surface of the cathode active material to form a dense protective layer protecting the cathode active material. In subsequent charging and discharging processes, the protecting layer can effectively reduce a side reaction between the cathode active material and the electrolyte at high voltages, thereby improving the cycling performance and high-temperature storage performance of the lithium-ion battery at high voltages, thus achieving the purpose of improving material performance.

It should be noted that the present inventors have conducted extensive research on the electrolyte, the active material, among others, of lithium ion batteries, and creatively found from a series of newly synthesized compounds that addition of the compound represented by structural formula I to the cathode material effectively reduces a side reaction between the cathode active material and the electrolyte at high voltages, thereby improving the cycling performance and high-temperature storage performance of the lithium-ion battery at high voltages. It is based on the in-depth study of the compound represented by structural formula I that this application is filed.

The present application is further described in detail below by way of specific embodiments. The following examples are only intended to further illustrate the present application and are not to be construed as limiting the present application.

In the following examples and comparative examples, the cathode current collector used was aluminum foil with a thickness of 16 μm, the cathode binder used was polyvinylidene fluoride (abbreviated as PVDF), the conductive agent used was conductive carbon black Super-P, and the cathode active material used was $LiNi_{0.5}Mn_{0.3}Co_{0.2}O_2$ (abbreviated as NMC) or $LiCoO_2$ (abbreviated as LCO). The anode current collector used was copper foil with a thickness of 8 μm, the anode binder used was styrene-butadiene rubber (abbreviated as SBR), the anode conductive agent used was Super-P, and the anode active material used was artificial graphite (abbreviated as FSN-1). The lithium battery separator used was a commercially available 20 μm PP/PE/PP three-layer separator. The electrolyte comprised 1M lithium hexafluorophosphate (abbreviated as $LiPF_6$), and the solvent was a mixed solvent of ethylene carbonate (abbreviation as EC):ethyl methyl carbonate (abbreviation as EMC):diethyl carbonate (abbreviation as DEC)=30:50:20 by volume.

EXAMPLE 1

The cathode material of this example was composed of a cathode active material, a compound represented by structural formula II having a molecular weight of 200,000, PVDF as binder, and Super-P as conductive agent. Specifically, the above components were mixed with a solvent to form a cathode slurry, and the mixture was coated onto the surface of the cathode current collector and dried to prepare a cathode plate comprising the above cathode material, which was then assembled into a lithium-ion battery and tested for its performance.

Preparation of the cathode plate: $LiNi_{0.5}Mn_{0.3}Co_{0.2}O_2$ as cathode active material, the compound represented by structural formula II having a molecular weight of 200,000, PVDF as binder, and Super-P as conductive agent were mixed in a mass ratio of 95:1:2:2; the mixture was dispersed in N-methyl-2-pyrrolidone (abbreviated as NMP) to obtain a cathode slurry; the cathode slurry was uniformly coated onto both sides of the aluminum foil, and dried to obtain cathode material layers; and the aluminum foil current collector having the cathode material layers was subjected to roll pressing, vacuum drying, and cutting, followed by welding of aluminum lead wires by an ultrasonic welder to obtain the cathode plate.

Preparation of the anode plate: artificial graphite, Super-P, SBR and CMC were mixed in a mass ratio of 96:1:1.2:1.8; the mixture was dispersed in deionized water to obtain a anode slurry; the anode slurry was coated onto both sides of the copper foil, and dried to obtain anode slurry layers; and the copper foil current collector having the anode slurry layers was subjected to roll pressing, vacuum drying, and cutting, followed by welding of nickel lead wires by an ultrasonic welder to obtain the anode plate.

Preparation of the separator: A commercially available PP/PE/PP three-layer separator having a thickness of 20 μm was used.

Preparation of the electrolyte: A non-aqueous mixed solvent was prepared using EC:EMC:DEC=30:50:20 by volume, and lithium hexafluorophosphate was added into the mixture to a final concentration of 1.0 mol/L to obtain the electrolyte of this example.

Battery assembling: A three-layer separator having a thickness of 20 μm was placed between the cathode plate and the anode plate, and the resulting sandwich structure composed of the cathode plate, the anode plate and the separator was wound. The wound structure was flattened and placed into an aluminum foil packing bag, and baked at 75°

C. for 48 hours to obtain a battery core, which was to be injected with electrolyte. Then, the battery core was injected with the electrolyte prepared, and was vacuum-packed and allowed to stand for 24 hours.

Battery formation: 0.05 C constant current charging for 180 min, 0.1 C constant current charging to 3.95V, vacuum packing again and standing at 45° C. for 48 h, then further, 0.2 C constant current charging to 4.4V, and 0.2 C constant current discharging to 3.0V.

The battery of this example was subjected to capacity retention rate test of 1 C cycling for 300 cycles at 45° C.; capacity retention rate, capacity recovery rate, and thickness expansion rate tests after storage at 60° C. for 21 days; and normal temperature DCIR test.

(1) The capacity retention rate test of 1 C cycling for 300 cycles at 45° C. was in fact to measure the high-temperature cycling performance of the battery. The specific test method comprised: subjecting, at 45° C., the formed battery to 1 C constant current and constant voltage charging to 4.35V, with the cut-off current being 0.01 C, followed by 1 C constant current discharging to 3.0V. After 300 cycles of charging/discharging, the capacity retention rate after the $300^{th}$ cycle was calculated to evaluate the high-temperature cycling performance. The formula for calculating the capacity retention rate after 300 cycles of 1 C cycling at 45° C. is as follows:

Capacity retention rate after the $300^{th}$ cycle (%)= (discharge capacity at $300^{th}$ cycle/discharge capacity at the $1^{st}$ cycle)×100%.

(2) The test method of capacity retention rate, capacity recovery rate and thickness expansion rate after storage at 60° C. for 21 days comprised: subjecting, at a normal temperature, the formed battery to 1 C constant current constant voltage charging to 4.35 V, with the cut-off current being 0.01 C; followed by 1 C constant current discharging to 3.0 V, at which time the initial discharge capacity of the battery was measured, followed by 1 C constant current constant voltage charging to 4.35V, with the cut-off current being 0.01 C, at which time the initial thickness of the battery was measured; followed by storage of the battery at 60° C. for 21 days, at which time the thickness of the battery was measured; followed by 1 C constant current discharging to 3.0V, at which time the retention capacity of the battery was measured; followed by 1 C constant current constant voltage charging to 4.35V, with the cut-off current being 0.01 C; and followed by 1 C constant current discharging to 3.0 V, at which time the recovery capacity was measured. The formulas for calculating the capacity retention rate, capacity recovery rate, and thickness expansion rate are as follows:

Battery capacity retention rate (%)=retention capacity/initial capacity×100%

Battery capacity recovery rate (%)=recovery capacity/initial capacity×100%

Battery thickness expansion rate (%)=(thickness after 21 days−initial thickness)/initial thickness× 100%.

(3) Normal temperature DC impedance (DCIR) performance test: Subjecting, at 25° C., the formed battery to 1 C charging to SOC=50%, followed by respectively subjecting the battery to 0.1 C, 0.2 C, 0.5 C, 1 C, and 2 C charging and discharging for 10 seconds and respectively recording the charge and discharge cut-off voltage. Then, a linear relationship plot (unit: mV) was prepared by plotting the charge and discharge currents at different rates on the abscissa (unit: A) and plotting the cut-off voltages corresponding to the charge and discharge currents on the ordinate.

Discharge DCIR value=slope of the linear plot of different discharge currents vs corresponding cut-off voltages.

The test results are shown in Table 1.

EXAMPLES 2-11

In Examples 2 to 11, the content of the conductive agent Super-P in the cathode slurry layer of the cathode plate was fixed at 2%; the amount of PVDF was 1% in Example 9, and 2% in the other Examples; the three additives of structural formula 2, structural formula 3 and structural formula 4 and their amounts in the Examples were added according to Table 1. Increasing the amount of an additive was achieved by correspondingly decreasing the weight of the cathode active material. For example, if the amount of the additive in Example 5 was 5%, then the amount of the cathode active material was correspondingly reduced to 91%. That is, the cathode active material, the compound represented by structural formula II having a molecular weight of 200,000, PVDF, and Super-P were mixed in a mass ratio of 91:5:2:2.

The cathode slurry and the cathode plate of these Examples were prepared in the same manner as in Example 1. The other components of the lithium-ion battery and battery assembly and formation were also the same as in Example 1. The lithium-ion batteries of Examples 2 to 11 were subjected to capacity retention rate test of 1 C cycling for 300 cycles at 45° C., capacity retention rate, capacity recovery rate, and thickness expansion rate tests after storage at 60° C. for 21 days, and normal temperature DCR test using the same test methods. The test results are shown in Table 1.

EXAMPLES 12

In this example, $LiCoO_2$ cathode active material was substituted for $LiNi_{0.5}Mn_{0.3}Co_{0.2}O_2$ in Example 1, the rest was the same as in Example 1.

Similarly, the lithium-ion battery in this example was subjected to capacity retention rate test of 1 C cycling for 300 cycles at 45° C., capacity retention rate, capacity recovery rate, and thickness expansion rate tests after storage at 60° C. for 21 days, and normal temperature DCR test using the same test methods as in Example 1. The test results are shown in Table 1.

COMPARATIVE EXAMPLE 1

To prepare the cathode plate in this example, the cathode active material $LiNi_{0.5}Mn_{0.3}Co_{0.2}O_2$, the binder PVDF, and the conductive agent Super-P were mixed at a mass ratio of 96:2:2, and the mixture was dispersed in N-methyl-2-pyrrolidone to obtain the cathode slurry. Other aspects were the same as in Example 1.

Similarly, the lithium-ion battery in this example was subjected to capacity retention rate test of 1 C cycling for 300 cycles at 45° C., capacity retention rate, capacity recovery rate, and thickness expansion rate tests after storage at 60° C. for 21 days, and normal temperature DCR test using the same test methods as in Example 1. The test results are shown in Table 1.

COMPARATIVE EXAMPLE 2

To prepare the cathode plate in this example, the cathode active material $LiCoO_2$, the binder PVDF, and the conductive agent Super-P were mixed at a mass ratio of 96:2:2, and the mixture was dispersed in N-methyl-2-pyrrolidone to obtain the cathode slurry. Other aspects were the same as in Example 1.

Similarly, the lithium-ion battery in this example was subjected to capacity retention rate test of 1 C cycling for 300 cycles at 45° C., capacity retention rate, capacity recovery rate, and thickness expansion rate tests after storage at 60° C. for 21 days, and normal temperature DCR test using the same test methods as in Example 1. The test results are shown in Table 1.

It can be seen from the results in Table 1 above that addition of the three compounds having the general structural formula I according to the present application, that is, the compound represented by structural formula II, the compound represented by structural formula III and the compound represented by structural formula IV in the preparation of the cathode plate significantly improved the high-temperature cycling performance and high-temperature storage performance of the battery.

In the test results of Examples 1-11 of the present application where the battery was an NMC battery, it can be

TABLE 1

Components and amounts thereof for the cathode slurries in the Examples, and results of battery performances in the tests.

| | Cathode active material | Additive and amount thereof | Amount of PVDF (%) | Capacity retention rate after cycling for 300 cycles (%) | Storage at 60° C. for 21 days | | | Normal temperature discharge DCIR (mΩ) |
|---|---|---|---|---|---|---|---|---|
| | | | | | Capacity retention rate (%) | Capacity recovery rate (%) | Thickness expansion rate (%) | |
| Example | | | | | | | | |
| 1 | NMC | Compound represented by structural formula II having a mw of 200,000, 1% | 2 | 85.2 | 78.9 | 83.2 | 8.5 | 32.7 |
| 2 | NMC | Compound represented by structural formula II having a mw of 200,000, 0.1% | 2 | 74.3 | 53.2 | 58.3 | 25.7 | 32.1 |
| 3 | NMC | Compound represented by structural formula II having a mw of 200,000, 0.5% | 2 | 80.5 | 71.7 | 75.8 | 12.3 | 32.8 |
| 4 | NMC | Compound represented by structural formula II having a mw of 200,000, 3% | 2 | 86.7 | 77.8 | 81.2 | 7.1 | 33.9 |
| 5 | NMC | Compound represented by structural formula II having a mw of 200,000, 5% | 2 | 87.5 | 75.3 | 78.2 | 5.6 | 35.7 |
| 6 | NMC | Compound represented by structural formula II having a mw of 50,000, 1% | 2 | 84.8 | 78.5 | 82.1 | 8.2 | 31.2 |
| 7 | NMC | Compound represented by structural formula II having a mw of 500,000, 1% | 2 | 86.8 | 77.9 | 81.2 | 5.4 | 33.7 |
| 8 | NMC | Compound represented by structural formula II having a mw of 1,000,000, 1% | 2 | 87.8 | 80.2 | 83.2 | 6.8 | 33.1 |
| 9 | NMC | Compound represented by structural formula II having a mw of 200,000, 1% | 1 | 75.5 | 62.3 | 67.8 | 10.5 | 29.2 |
| 10 | NMC | Compound represented by structural formula III having a mw of 200,000, 1% | 2 | 83.2 | 72.3 | 74.5 | 12.5 | 28.5 |
| 11 | NMC | Compound represented by structural formula IV having a mw of 200,000, 1% | 2 | 81.2 | 74.5 | 76.8 | 10.5 | 32.8 |
| 12 | LCO | Compound represented by structural formula II having a mw of 200,000, 1% | 2 | 74.5 | 55.3 | 57.2 | 16.5 | 28.2 |
| Comparative example | | | | | | | | |
| 1 | NMC | | 2 | 72.1 | 51.5 | 56.9 | 28.5 | 32.3 |
| 2 | LCO | | 2 | 56.7 | 45.5 | 51.2 | 38.5 | 27.5 | found by comparing Comparative example 1 with Examples 1 to 5 that addition of the compound represented by structural formula II to the cathode slurry layer significantly improved the cycling performance and the high-temperature performance without compromising the power performance. As the amount of the compound represented by structural formula II increased, the high-temperature cycling performance and the storage performance gradually improved, and the corresponding DCIR slightly improved.

Comparing Comparative example 1 with Examples 1, 6, 7, and 8, it was found that as the molecular weight of the compound represented by structural formula II increased, the high-temperature cycling performance slightly improved.

Comparing Comparative Example 1 and Example 9, it was found that when the compound represented by structural formula II was used in place of part of the binder, the high-temperature cycling performance and the high-temperature performance significantly improved.

Comparing Comparative Example 2 with Example 12, it was found that in the LCO battery, the compound represented by structural formula II also significantly improved the high-temperature cycling performance and the high-temperature storage performance.

Thus, in the present application, addition of the compound represented by structural formula I in the cathode slurry to form a protective layer on the surface of the particles of the cathode active material can reduce a side reaction between the cathode active material and the electrolyte at high voltages, and improve the performances of the lithium-ion battery at high voltages. The cathode plate prepared using the cathode slurry of the present application can improve the cycling performance and the storage performance of the lithium-ion battery.

Based on the above Examples, the present applicant further studied the molecular weight and amount of the compounds represented by structural formula II, structural formula III and structural formula IV. The results show that compounds having a molecular weight of between 50,000 and 2,000,000 can be used in the present application, and the amount thereof is preferably between 0.1% and 5% of the total weight of the cathode material. An amount of below 0.1% would not provide a good protective effect, while an amount of above 5% would increase the impedance of the battery and degrade the low-temperature performance and the power performance of the battery.

As for the binder and the conductive agent, the present applicant also conducted in-depth research on their type and amount. The results show that an amount of PVDF in the range of 0.5% to 5% of the total weight of the cathode material provided a better effect, and an amount of Super-P in the range of 0.5% to 5% of the total weight of the cathode material provided a better effect. Other types of the binder, such as polyvinyl alcohol binder, polyurethane binder, polyacrylate binder, butyl rubber binder, epoxy resin binder, vinyl acetate resin binder, chlorinated rubber binder and polytetrafluoroethylene can also be used in the present application. Other types of the conductive agent, such as superconducting carbon black, conductive graphite, acetylene black, and carbon nanotube, and the like, can also be used in the present application.

As to the type of the cathode active material, in addition to NMC and LCO, any cathode active material which is commonly used in the art can also be used in the present application, for example, the compounds represented by general formula I of $Li_xNi_yM_{1-y}O_2$, general formula II of $Li_xCo_kM'_{1-k}O_2$ and general formula III of $Li_{x''}M''PO_4$, wherein in general formula I, $0.5 \leq x \leq 1$, $y \geq 0.3$, M is at least one of Co, Mn, Al, Ti, Fe, Zn, Zr, Mg, Cr, and Ba; in general formula II, $0.5 \leq x' \leq 1$, $k \geq 0.8$, and M' is at least one of Ni, Mn, Al, Ti, Fe, Zn, Zr, Mg, Cr, and Ba; and in general formula III, $0.5 \leq x'' \leq 1$, and M'' is at least one of Ni, Mn, and Co.

The above is a further detailed description of the present application in conjunction with particular embodiments, and the specific implementation of the present application is not to be construed as limiting to such description. It will be apparent to those skilled in the art that several simple derivations and substitutions can be made without departing from the concept of the present application and such derivations and substitutions shall be deemed to fall within the scope of protection of the present application.

The invention claimed is:

1. A cathode plate of a lithium-ion battery, comprising a cathode current collector and a cathode material on the cathode current collector, the cathode material comprising a cathode active material, a binder, a conductive agent and an additive, wherein the additive including at least one compound represented by structural formula I;

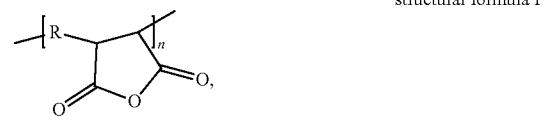

structural formula I wherein the monomer of R in structural formula I is R1, and R1 is an alkenyl compound or an alkenyl-containing ether compound, and n is a positive integer.

2. The cathode plate according to claim 1, wherein the compound represented by structural formula I has a molecular weight of between 50,000 and 2,000,000.

3. The cathode plate according to claim 1, wherein the compound represented by structural formula I is selected from at least one compound represented by structural formula II, structural formula III, structural formula IV and structural formula V;

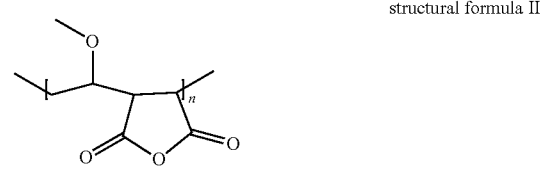

structural formula II

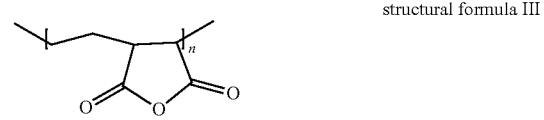

structural formula III

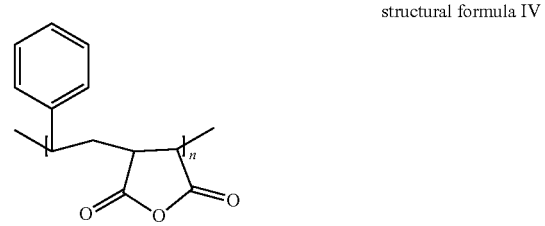

structural formula IV

-continued

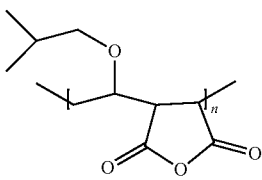

structural formula V wherein in structural formula II, structural formula III, structural formula IV and structural formula V, n is a positive integer.

4. The cathode plate according to claim 1, wherein the compound represented by structural formula I accounts for 0.1% to 5% of the total weight of the cathode material.

5. The cathode plate according to claim 1, wherein the cathode active material is selected from at least one compound represented by general formula I, general formula II and general formula III, general formula I being $Li_xNi_yM_{1-y}O_2$, general formula II being $Li_{x'}Co_kM'_{1-k}O_2$, and general formula III being $Li_{x''}M''PO_4$;
wherein, in general formula I, $0.5 \leq x \leq 1$, $y \geq 0.3$, M is at least one of Co, Mn, Al, Ti, Fe, Zn, Zr, Mg, Cr and Ba; in general formula II, $0.5 \leq x' \leq 1$, $k \geq 0.8$, M' is at least one of Ni, Mn, Al, Ti, Fe, Zn, Zr, Mg, Cr and Ba; and in general formula III, $0.5 \leq x'' \leq 1$, M'' is at least one of Ni, Mn and Co.

6. The cathode plate according to claim 1, wherein the binder accounts for 0.5% to 5% of the total weight of the cathode material, and the conductive agent accounts for 0.5% to 5% of the total weight of the cathode material.

7. The cathode plate according to claim 6, wherein the conductive agent is at least one selected from the group consisting of conductive carbon black, superconducting carbon black, conductive graphite, acetylene black, and carbon nanotube, preferably, the conductive agent is at least one selected from the group consisting of conductive carbon black, conductive graphite, and acetylene black; more preferably, the conducive agent is conductive carbon black and/or ethylene black; and most preferably, the conductive agent is conductive carbon black; preferably, the binder is at least one selected from the group consisting of polyvinyl alcohol binder, polyurethane binder, polyacrylate binder, butyl rubber binder, epoxy resin binder, vinyl acetate resin binder, chlorinated rubber binder, polyvinylidene fluoride binder, and polytetrafluoroethylene binder; and more preferably, the binder is polytetrafluoroethylene binder.

8. A method for preparing the cathode plate according to claim 1, comprising the steps of:
(1) adding and dispersing a cathode active material, a conductive agent, a binder, and an additive into a solvent to obtain a cathode slurry;
wherein the additive comprises at least one compound represented by structural formula I;

structural formula I wherein the monomer of R in structural formula I is R1, and R1 is an alkenyl compound or an alkenyl-containing ether compound, and n is a positive integer;
(2) coating the cathode slurry obtained in step (1) onto the surface of a cathode current collector, followed by drying, roll pressing and cutting to obtain the cathode plate.

9. A lithium-ion battery using the cathode plate according to claim 1.

* * * * *